(12) United States Patent
Gao et al.

(10) Patent No.: US 12,012,130 B2
(45) Date of Patent: Jun. 18, 2024

(54) REUSABLE COLLISION ENERGY ABSORPTION DEVICE FOR RAIL VEHICLE

(71) Applicant: CENTRAL SOUTH UNIVERSITY, Hunan (CN)

(72) Inventors: Guangjun Gao, Changsha (CN); Weiyuan Guan, Changsha (CN); Shuai Wang, Changsha (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 931 days.

(21) Appl. No.: 17/044,826

(22) PCT Filed: Oct. 30, 2018

(86) PCT No.: PCT/CN2018/112615
§ 371 (c)(1),
(2) Date: Oct. 1, 2020

(87) PCT Pub. No.: WO2020/056849
PCT Pub. Date: Mar. 26, 2020

(65) Prior Publication Data
US 2021/0094592 A1   Apr. 1, 2021

(30) Foreign Application Priority Data

Sep. 22, 2018 (CN) .......................... 201811111118.6
Sep. 22, 2018 (CN) .......................... 201811111126.0

(51) Int. Cl.
*B61G 11/12* (2006.01)
*B61D 15/06* (2006.01)
*B61F 19/04* (2006.01)

(52) U.S. Cl.
CPC .............. *B61G 11/12* (2013.01); *B61D 15/06* (2013.01); *B61F 19/04* (2013.01); *B60Y 2200/30* (2013.01)

(58) Field of Classification Search
CPC .......... B61F 19/04; B61F 99/00; B61D 15/06; B61G 11/00; B61G 11/12; B61G 11/14;
(Continued)

(56) References Cited

U.S. PATENT DOCUMENTS 3,139,989 A * 7/1964 Thornhill ............... B61G 11/12
                                                          213/43
5,443,146 A * 8/1995 Ayyildiz ................. F16F 9/063
                                                          188/374
(Continued)

FOREIGN PATENT DOCUMENTS

CN         2185702 Y     12/1994
CN         2456972 Y     10/2001
(Continued)

OTHER PUBLICATIONS

International Search Report in the international application No. PCT/CN2018/112615, dated May 23, 2019.
(Continued)

*Primary Examiner* — Zachary L Kuhfuss
(74) *Attorney, Agent, or Firm* — Syncoda LLC; Feng Ma

(57) ABSTRACT

A reusable collision energy absorption device for a rail vehicle includes an impacted rod, a damping structure including a damping plug, a guide tube and a damping elastic element, a return structure including a return piston and an elastic return element, an outer tube having a tubular structure, and an interior partitioned into a front cavity and a rear cavity through a partition plate provided with a damping hole in the form of a through hole. A portion of the damping plug is in the damping hole when the damping plug is in an initial position, and the damping plug can move in a front-rear direction when the device is impacted. A gap between a radial thickest portion of the damping plug and
(Continued)

the damping hole allows the fluid to circulate between the front cavity and the rear cavity.

20 Claims, 11 Drawing Sheets

(58) Field of Classification Search
 CPC ..... B61G 11/16; B61G 11/18; B60Y 2200/30; F16F 9/063; F16F 13/06; F16F 7/125
 See application file for complete search history.

(56) References Cited

U.S. PATENT DOCUMENTS

| | | | | |
|---|---|---|---|---|
| 5,927,523 | A * | 7/1999 | Huggins | F16F 13/06 188/287 |
| 8,376,159 | B2 * | 2/2013 | Mombour | F16F 9/48 213/43 |
| 10,279,822 | B2 * | 5/2019 | Gao | B61G 11/16 |
| 2011/0079569 | A1 | 4/2011 | Mombour | |
| 2011/0114427 | A1 * | 5/2011 | Parida | F16F 9/303 29/428 |
| 2018/0208219 | A1 | 7/2018 | Gao | |

FOREIGN PATENT DOCUMENTS

| | | | | |
|---|---|---|---|---|
| CN | 201102518 | Y | 8/2008 | |
| CN | 102030014 | A | 4/2011 | |
| CN | 203876739 | U | 10/2014 | |
| CN | 104842910 | A * | 8/2015 | |
| CN | 104842910 | A | 8/2015 | |
| CN | 105292164 | A | 2/2016 | |
| CN | 105644579 | A | 6/2016 | |
| CN | 105966416 | A | 9/2016 | |
| CN | 105966417 | A | 9/2016 | |
| CN | 106240595 | A | 12/2016 | |
| CN | 108860206 | A | 11/2018 | |
| CN | 109204368 | A | 1/2019 | |
| DE | 2434053 | A * | 2/1976 | ............ B60G 15/00 |
| DE | 2434053 | A1 | 2/1976 | |
| EA | 200900237 | A1 | 8/2010 | |
| EA | 015192 | B1 | 6/2011 | |
| EP | 0225167 | A1 * | 6/1987 | |
| FR | 1287542 | A * | 3/1962 | |
| FR | 1287542 | A | 3/1962 | |
| GB | 983394 | A | 2/1965 | |
| GB | 1428767 | A | 3/1976 | |
| KR | 100845225 | B1 | 7/2008 | |
| RU | 2253582 | C2 | 6/2005 | |

OTHER PUBLICATIONS

Supplementary European Search Report in the European application No. 18934185.2, dated Dec. 9, 2021.
Written Opinion of the International Search Authority in the international application No. PCT/CN2018/112615, dated May 23, 2019.

* cited by examiner

REUSABLE COLLISION ENERGY ABSORPTION DEVICE FOR RAIL VEHICLE

CROSS-REFERENCE TO RELATED APPLICATIONS

This application is a U.S. national stage of International Patent Application No. PCT/CN2018/112615 filed on Oct. 30, 2018, which claims priority to Chinese Patent Application Nos. 201811111126.0 and 201811111118.6 filed on Sep. 22, 2018. The disclosures of these applications are hereby incorporated by reference in their entireties.

TECHNICAL FIELD

The disclosure belongs to the field of a safety device for a rail vehicle, and more particularly relates to a reusable collision energy absorption device for a rail vehicle.

BACKGROUND

With the development of rail transit, people pay more and more attention to the safety performance of rail vehicles. Energy absorption devices in current rail vehicles are mainly based on metal crush energy absorption, and the device structure cannot be used again after crushing. A mechanical characteristic curve of each of the devices is generally a sawtooth wave line with a large peak, which requires a high trigger threshold, resulting in a large deceleration peak value. This is not conducive to passenger safety.

The patents CN201610860262.4 and CN201610115228.4 previously developed by the inventors of the disclosure both provide a collision energy absorption device for a rail vehicle. These collision energy absorption devices have all achieved good collision buffering effects, but the devices all cannot be reused.

In some other fields, such as the field of automobile collision energy absorption devices, reusable oil buffers may be applied. However, the bearable impact speed limits and the absorbable energy levels of these types of device structures cannot meet the relevant requirements in the field of rail vehicles.

Therefore, there is an urgent need in the art to develop a reusable collision energy absorption device for a rail vehicle.

SUMMARY

Therefore, the disclosure provides a reusable collision energy absorption device for a rail vehicle. The energy absorption device includes an impacted rod, an outer tube, a damping structure, a return structure, and an end base. The damping structure includes a damping plug, a guide tube and a damping elastic element, and the return structure includes a return piston and an elastic return element. The outer tube is of a tubular structure and an interior of the outer tube is partitioned into a front cavity and a rear cavity through a partition plate, and the partition plate is provided with a damping hole in the form of a through hole, so that a damping fluid can circulate between the front cavity and the rear cavity. The impacted rod includes an impacted end at a front end thereof and a piston end at a rear end thereof, the piston end of the impacted rod is arranged inside the outer tube, and the impacted end is arranged outside the outer tube. At least a portion of a length of the damping plug is arranged in the damping hole when the damping plug is located at an initial position. The damping plug can move in a front-rear direction of the device when the device is impacted. A rear end of the outer tube is fixedly connected to the end base so that the entire collision energy absorption device can be fixedly arranged on the rail vehicle. The rear cavity is provided with the guide tube, the damping elastic element, the return piston and the elastic return element. A front end of the guide tube is provided with a via hole through which a rear end of the damping plug is arranged inside the guide tube. A radial size of the rear end of the damping plug matches with an inner diameter of the guide tube so that the rear end of the damping plug can move frontward and rearward along an inner wall of the guide tube after the energy absorption device is impacted. The return piston is fixedly arranged on the end base through the elastic return element in the initial position. A damping fluid is filled in a cavity between the rear end of the impacted rod and a front end of the return piston. A size of a radial thickest portion of the damping plug is smaller than a radial size of the damping hole, so that a gap is formed therebetween for the damping fluid to circulate between the front cavity and the rear cavity.

In a specific implementation manner, the guide tube is of a tubular structure and has a rear end fixedly arranged on the end base, and the rear end of the damping plug is fixedly arranged on the end base through the damping elastic element in the initial position. The return piston is arranged outside an outer wall of the guide tube, and the return piston can move frontward and rearward under a guidance of the outer wall of the guide tube and an inner wall of the outer tube, or under a guidance of the outer wall of the guide tube or the inner wall of the outer tube, after the energy absorption device is impacted.

In another specific implementation manner, the damping structure further includes a small base of end that is also arranged in the rear cavity. The guide tube is of a tubular structure and has a front end fixedly arranged on the partition plate through a connecting plate. The small base of end is fixedly arranged inside the rear end of the guide tube, and the rear end of the damping plug is fixedly arranged on the small base of end through the damping elastic element in the initial position. The return piston is arranged at an axial rear end of the guide tube, and the return piston can move frontward and rearward under the guidance of the inner wall of the outer tube after the energy absorption device is impacted. The guide tube is also provided with feed through orifices so that the damping fluid can flow in the front cavity, the gap, the feed through orifices, and the rear cavity in a region outside the guide tube and the small base of end. In a specific implementation manner, the energy absorption device further includes a blocking member arranged between the small base of end and the return piston for preventing the return piston from excessively returning and colliding with the small base of end. Preferably, the blocking member is a blocking ring fixedly arranged on the inner wall of the outer tube. Preferably, the connecting plate at the front end of the guide tube is fixedly arranged on the partition plate by bolts.

In a specific implementation manner, the gap is an annular gap with a width of 0.01 to 5 mm, preferably 0.5 to 1.5 mm. Preferably, the damping fluid is hydraulic oil. Preferably, the device further includes a sealing member arranged at the frontmost end of the outer tube and radially outwardly from a middle portion of the impacted rod.

In a specific implementation manner, a front end of the damping plug is a structure having a truncated cone shape or a truncated pyramid shape and being thicker from front to rear.

In a specific implementation manner, the damping elastic element and the elastic return element are both one of a spring and an inert gas. Preferably, when the damping elastic element is a spring, a spring stiffness thereof is 50 to 2000 N/mm, preferably 100 to 1000 N/mm.

In a specific implementation manner, in an initial state, a volume of a cavity between a rear end surface of the impacted rod and a front end surface of the partition plate is larger than a volume of a cavity between a rear end surface of the partition plate and a front end surface of the return piston.

In a specific implementation manner, an axial thickness of the partition is d, in which d is 5 to 100 mm, and preferably d is 15 to 45 mm. When the device is in the initial position, a front end surface of the damping plug is flush with the front end surface of the partition plate, or the front end surface of the damping plug is within 0.5 d ahead of the front end surface of the partition plate, or the front end surface of the damping plug is within 0.8 d behind the front end surface of the partition plate.

In a specific implementation manner, an inner diameter of the guide tube is larger than a radial size of the via hole, and the inner diameter of the guide tube is larger than a radial size of the damping hole.

The disclosure has at least the following beneficial effects.

1. When the device of the disclosure is in an initial position, the front end of the damping plug is arranged in the damping hole. When the device is impacted, because the damping plug gradually exits the damping hole rearward, the volume in the damping hole filled with the damping plug becomes smaller, and the volume of the damping fluid in the corresponding damping hole gradually increases. Thus, the damping process according to the disclosure that occurs after a collision is a "non-constant" process, which is smoother than the collision process of "constant filling volume of damping fluid in damping hole" in the conventional art.

2. In a preferred manner, in the disclosure, when the front end of the damping plug is set to be a truncated cone shape or a truncated pyramid shape, that is thicker from front to rear, after the device is impacted, not only the damping plug exits the damping hole and causes an axial volume change, but also the front end of the damping plug in the damping hole changes in radial size, which makes the change of the "non-constant filling volume of damping fluid in damping hole after a collision" according to the disclosure more significant. This collision buffer process is smoother than that using a cylindrical or prismatic front end of the damping plug.

3. In the disclosure, the damping plug is subjected to different pressures from the damping elastic element and the damping fluid at different positions. Under an impact state, the device can automatically adjust the length of the damping plug protruding into the damping hole to form different damping structures, thereby achieving a smooth damping effect.

4. In general, after the collision energy absorption device of the disclosure is subjected to a collision, a mechanical characteristic curve thereof is perfect, the device has zero trigger force, the resistance force rises quickly, the buffering power is stable, the energy absorption effect is good, injuries to passengers in a secondary collision can be reduced, and the device can be repeatedly used so that the cost of the energy absorption device can be remarkably reduced.

DETAILED DESCRIPTION

Figure 1:
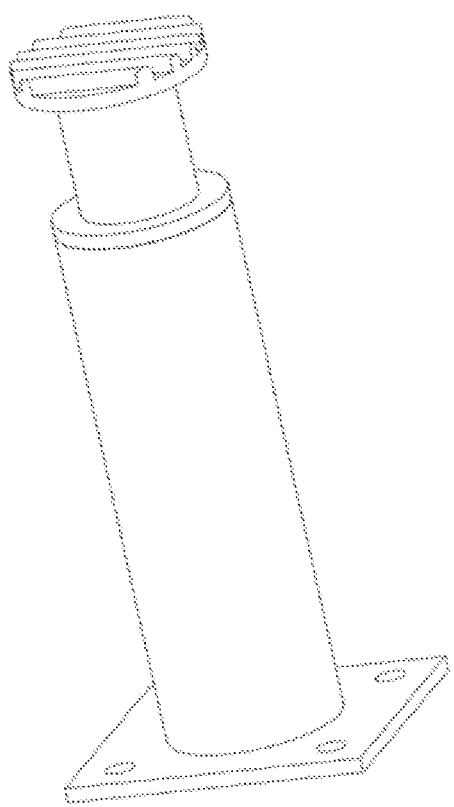
FIG. 1 is a schematic view of an appearance structure of an energy absorption device according to the disclosure.
Figure 2:
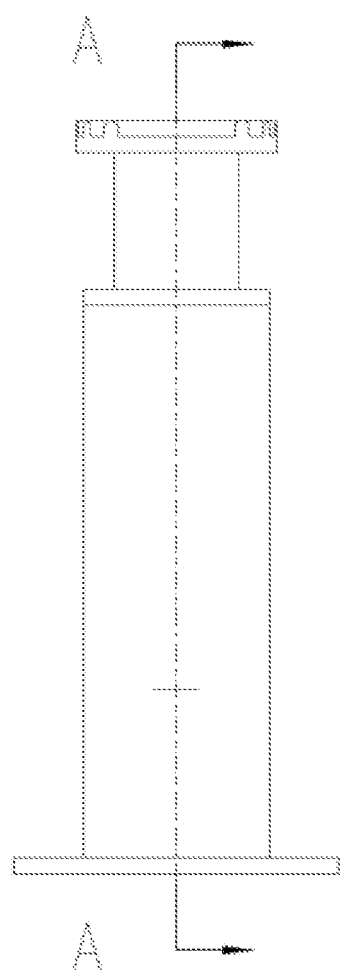
FIG. 2 is a front view of the structure shown in FIG. 1.
Figure 3:
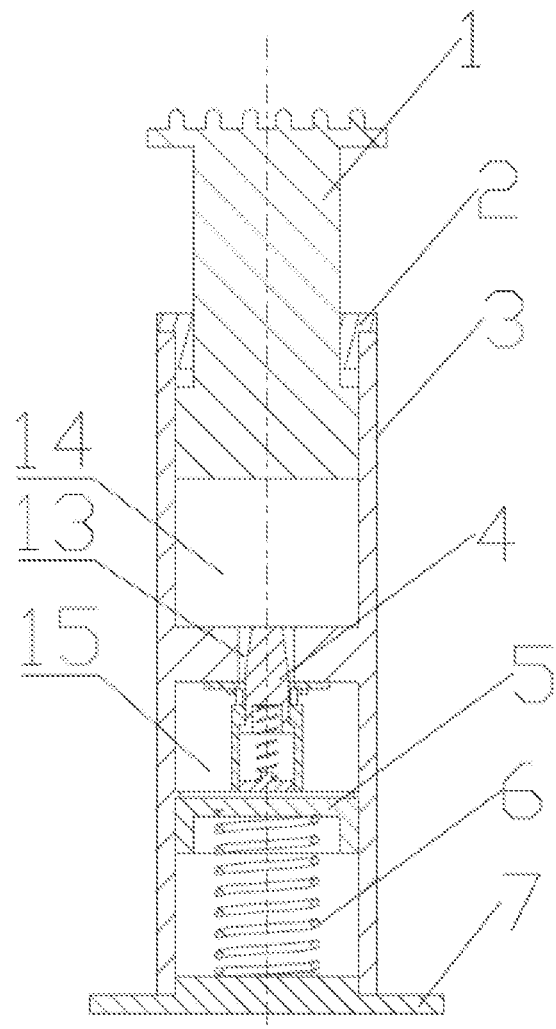
FIG. 3 is a sectional view taken along a line A-A of the structure shown in FIG. 1 and FIG. 2 in a first embodiment.
Figure 4:
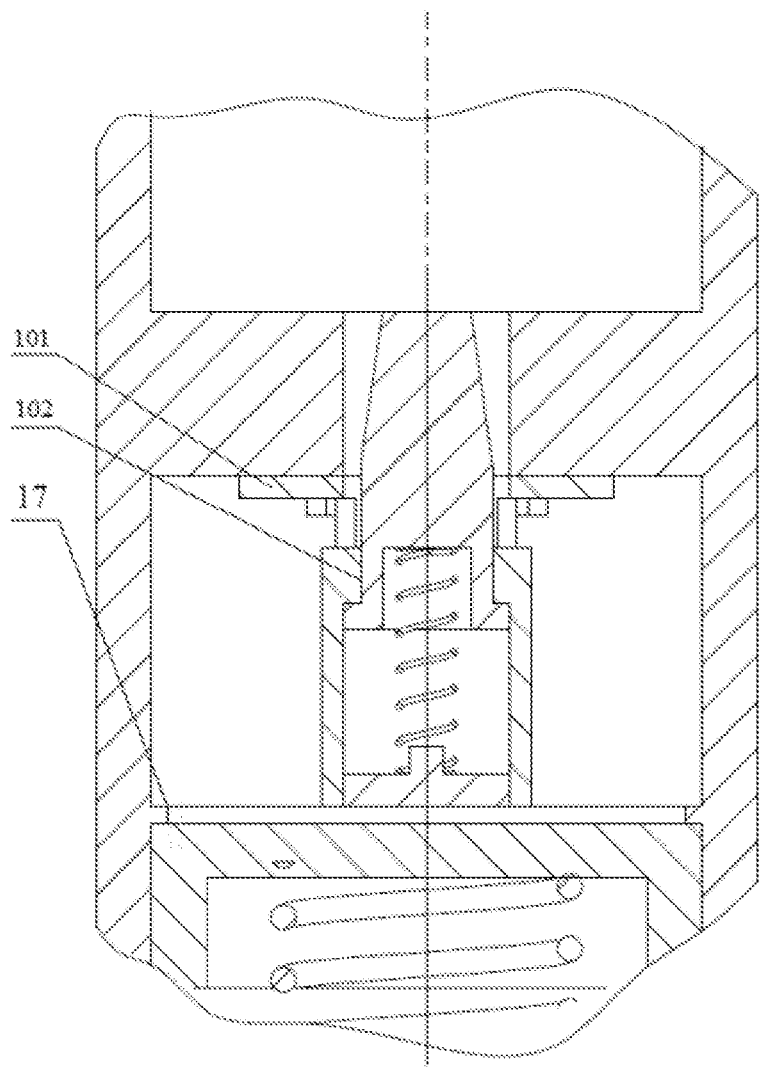
FIG. 4 is an enlarged schematic view of a part of the structure shown in FIG. 3.
Figure 5:
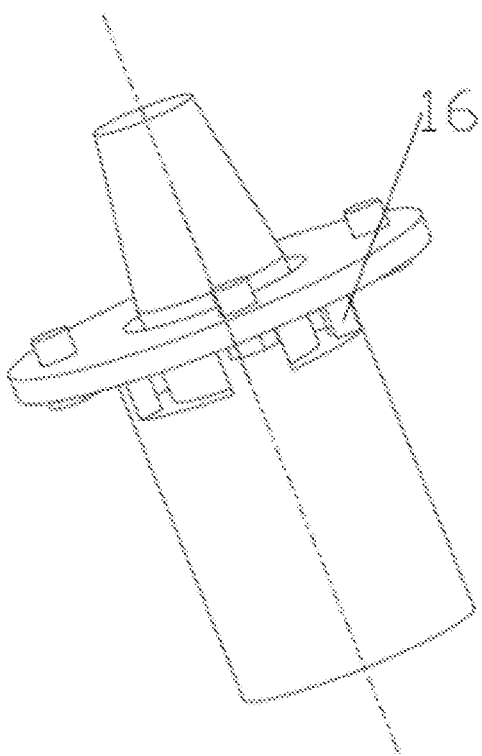
FIG. 5 is a schematic view of an appearance structure of a damping structure in an energy absorption device according to the disclosure.

The disclosure is illustrated by the following embodiments and drawings, but the scope of protection of the disclosure is not limited thereto, and the scope of protection of the disclosure shall be based on the claims.

First Embodiment

As shown in FIG. 1 to FIG. 7, the disclosure provides a reusable energy absorption device for an anti-collision of a rail vehicle. The energy absorption device includes an impacted rod, an outer tube, a damping structure, a return structure, and an end base. The damping structure includes a damping plug, a guide tube, a damping elastic element and a small base of end, and the return structure includes a return piston and an elastic return element. The outer tube is of a tubular structure and an interior of the outer tube is partitioned into a front cavity and a rear cavity through a partition plate. The partition plate is provided with a damping hole in the form of a through hole, so that a damping fluid can circulate between the front cavity and the rear cavity. The impacted rod includes an impacted end at a front end and a piston end at a rear end, the piston end of the impacted rod is arranged inside the outer tube, and the impacted end is arranged outside the outer tube. At least a portion of a length of the damping plug is arranged in the damping hole when the damping plug is located at an initial position, and the damping plug can move in a front-rear direction of the energy absorption device when the energy absorption device is impacted. A rear end of the outer tube is fixedly connected to the end base so that the entire energy absorption device can be fixedly arranged on a rail vehicle. The rear cavity is provided with the guide tube, the damping elastic element, the small base of end, the return piston and the elastic return element. The guide tube is of a tubular structure and has a front end fixedly arranged on the partition plate through a connecting plate. The guide tube is provided with a via hole through which a rear end of the damping plug is arranged inside the guide tube. The small base of end is fixedly arranged inside a rear end of the guide tube. The rear end of the damping plug is fixedly arranged on the small base of end through the damping elastic element in the initial position. A radial size of the rear end of the damping plug matches with an inner diameter of the guide tube so that the rear end of the damping plug can move frontward and rearward along an inner wall of the guide tube after the energy absorption device is impacted. The return piston is arranged at an axial rear end of the guide tube. The return piston is fixedly arranged on the end base through the elastic return element in the initial position, and the return piston can move frontward and rearward under a guidance of an inner wall of the outer tube after the energy absorption device is impacted. A damping fluid is filled in the cavity between the rear end of the impacted rod and the front end of the return piston. A size of a radial thickest portion of the damping plug is smaller than a radial size of the damping hole, so that a gap is formed therebetween for the damping fluid to circulate between the front cavity and the rear cavity. The guide tube is also provided with feed through orifices so that the damping fluid can flow in the front cavity, the gap, the feed through orifices, and the rear cavity in a region outside the guide tube and the small base of end.

It is to be noted that the expression "fixedly connected" or "fixedly arranged" in the disclosure includes a non-detachable fixed connection mode such as welding and a detachable fixed connection mode such as screwing. The initial position in the disclosure is a state of the damping structure before being impacted by an external force. In the disclosure, the term "axial" refers to the front-rear direction of the damping structure, and the term "radial" refers to a direction relative to the axial direction. The "radial size" in the disclosure does not mean that the corresponding component can only be of an axially symmetrical shape such as a cylindrical or truncated cone shape, and may also be a triangle, quadrangle, or other polygonal shapes in cross section.

Specifically, the damping hole is, for example, a cylindrical through hole with a diameter of 1 to 80 mm. The damping hole in the figure is a cylindrical hole with a diameter of 30 mm, and the front end of the corresponding damping plug is a truncated cone with a diameter of 20 mm at the thinnest point and of 28 mm at the thickest point, and being thicker from front to rear. The height of the truncated cone-shaped front end of the damping plug is consistent with the thickness of the partition plate. An annular gap with a width of 1 mm is formed between the truncated cone-shaped front end of the damping plug and the cylindrical damping hole. The inner diameter of the outer tube is 100 mm. In an initial position, the axial length (length between a rear end surface of the impacted rod and a front end surface of the partition plate) of the front cavity is 80 mm, and the axial length (length between a rear end surface of the partition plate and a front end surface of the return piston) of the rear cavity is 30 mm. In the disclosure, in the initial position, the front end surface of the damping plug is flush with the front end surface of the partition plate. After a collision ends, the front end surface of the damping plug is returned to a position in which the front end surface of the damping plug is flush with the front end surface of the partition plate, under the action of the return piston and of the elastic return element.

In a specific implementation manner, the damping elastic element and the elastic return element are both one of a spring and an inert gas. When the damping elastic element and the elastic return element are springs, the rear end of the damping plug is fixedly connected to the front end of the damping elastic element, and the rear end of the damping elastic element is fixedly connected to the small base of end. The rear end of the return spring is fixedly connected to the front end of the elastic return element, and the rear end of the elastic return element is fixedly connected to the end base. When the damping elastic element and the elastic return element are both inert gases, by filling a certain pressure of inert gas into the corresponding cavity, a relative position between the damping plug and the small base of end is fixed and a relative position between the return piston and the end base is fixed, in the initial position. During an impact of the energy absorption device, the inert gas is compressed and its internal pressure increases. When the impact ends, the external pressure decreases. At this time, the internal pressure of the inert gas is greater than the external pressure, and the inert gas will push the return piston to return to the initial position. In the disclosure, the damping fluid may be hydraulic oil, or may be another fluid having a large viscosity.

In a specific implementation manner, the energy absorption device further includes a sealing member 2 arranged at the frontmost end of the outer tube and radially outwardly from a middle portion of the impacted rod. Specifically, an axial gap between a front side of a piston end of the impacted rod and the sealing member is set to be a vacuum. In the disclosure, the sealing member 2 mainly performs the following functions. First, the extreme movement position of the impacted rod 1 when it returns frontward is blocked. Second, the sealing member 2 is provided separately from the outer tube 3 so that it is most convenient to handle the entire damping structure during assembly and maintenance. For example, there is no need to cut off and then weld the outer tube during assembly. Third, the sealing member 2 can play a role on the outer tube that it seals the damping fluid, so as to prevent the damping fluid from leaking outside the energy absorption device.

In a specific implementation manner, an axial thickness of the partition is d, d is 5 to 100 mm, and preferably d is 15 to 45 mm. In the initial position, the front end surface of the damping plug is flush with the front end surface of the partition plate, or the front end surface of the damping plug is within 0.5 d ahead of the front end surface of the partition plate, or the front end surface of the damping plug is within 0.8 d behind the front end surface of the partition plate. In the disclosure, in the initial position, if the front end surface of the damping plug protrudes too far from the front end surface of the partition plate, the damping plug may be damaged when the damping structure is impacted, and if the front end surface of the damping plug retracts too far from the front end surface of the partition plate, it is difficult to achieve an ideal impact effect. When the front end surface of the damping plug completely exits the damping hole and enters into the rear cavity, the flow of the damping fluid in the gap becomes the flow of the damping fluid in the entire damping hole, so almost no damping effect is achieved at this time.

The working principle of the energy absorption device in the disclosure is as follows. After an object of a certain mass and speed hits the impacted rod 1, the impacted rod 1 compresses the damping fluid in the front cavity, and the damping fluid generates a damping force through the damping structure. During the impact process, the damping plug moves rearward along the guide tube under the pressure of the damping fluid, and the damping elastic element connected to the damping plug has a reaction force against the damping plug. The two actions will cause the damping plug to move frontward and rearward along the guide tube, and the relative position between the damping plug and the damping hole changes during the movement to form a constantly changing damping structure, thereby achieving a better damping effect. During the impact process, as the damping fluid in the rear cavity increases, the return piston moves rearward along the inner wall of the outer tube under the pressure of the damping fluid. After the impact ends, the return piston returns to the initial position under the action of the elastic return element. During the return process, the return piston will push the damping fluid and the impacted rod to return to the initial position before the impact occurs.

Figure 8:
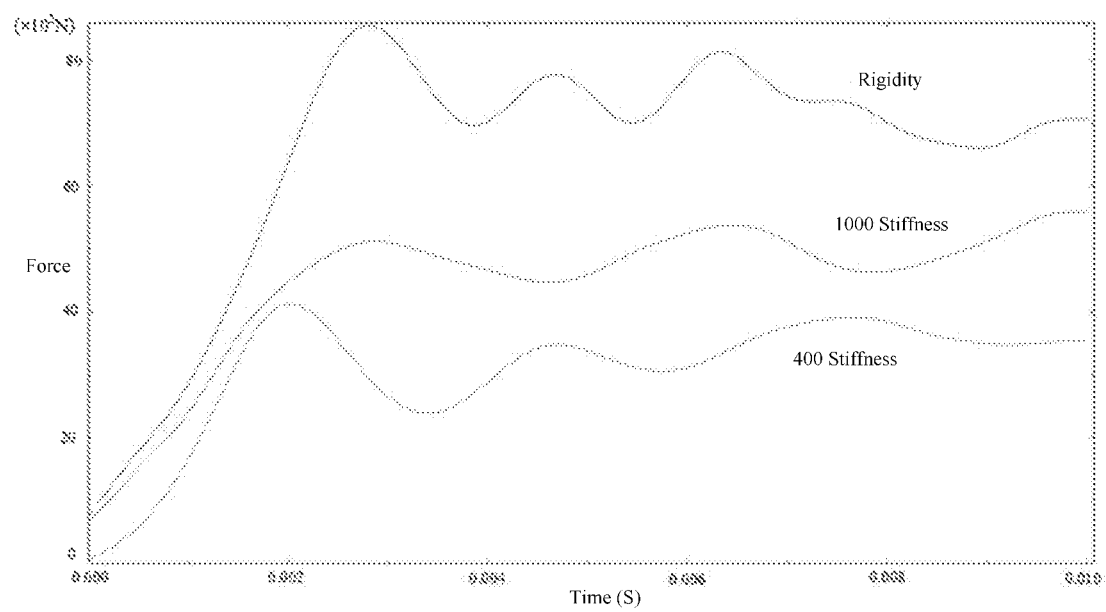
FIG. 8 is a simulation result of a collision of an energy absorption device according to the disclosure at different spring stiffness.

FIG. 8 is a simulation result of a collision of an energy absorption device according to the disclosure at different spring stiffness. The figure shows simulation data obtained by simulating a rigid spring (incompressible), a spring with a stiffness of 1000 N/mm, and a spring with a stiffness of 400 N/mm (which is easier to be compressed than the spring with a stiffness of 1000 N/mm) when the damping structure according to the disclosure is impacted by a 1-ton object at a speed of 7 meters per second. It can be seen from the simulation results that when the stiffness of the damping spring is 400 N/mm, the collision energy absorption effect of the energy absorption device is excellent.

Second Embodiment

As shown in FIG. 1, FIG. 2, and FIG. 9 to FIG. 11, the disclosure provides a reusable collision energy absorption device for a rail vehicle. The energy absorption device includes an impacted rod, an outer tube, a damping structure, a return structure, and an end base. The damping structure includes a damping plug, a guide tube and a damping elastic element, and the return structure includes a return piston and an elastic return element. The outer tube is of a tubular structure and an interior of the outer tube is partitioned into a front cavity and a rear cavity through a partition plate, and the partition plate is provided with a damping hole in the form of a through hole, so that a damping fluid can circulate between the front cavity and the rear cavity. The impacted rod includes an impacted end at a front end and a piston end at a rear end, the piston end of the impacted rod is arranged inside the outer tube, and the impacted end is arranged outside the outer tube. At least a portion of a length of the damping plug is arranged in the damping hole when the damping plug is in an initial position. The damping plug can move in a front-rear direction of the device when the device is impacted. A rear end of the outer tube is fixedly connected to the end base so that the entire collision energy absorption device can be fixedly arranged on a rail vehicle. The rear cavity is provided with the guide tube, the damping elastic element, the return piston and the elastic return element. The guide tube is of a tubular structure, a rear end of the guide tube can be fixedly arranged on the end base, and a front end of the guide tube can be provided with a via hole through which a rear end of the damping plug is arranged inside the guide tube. The rear end of the damping plug is fixedly arranged on the end base through the damping elastic element in the initial position. A radial size of the rear end of the damping plug matches with an inner diameter of the guide tube so that the rear end of the damping plug can move frontward and rearward along an inner wall of the guide tube after the energy absorption device is impacted. The return piston is arranged outside an outer wall of the guide tube. The return piston is fixedly arranged on the end base through the elastic return element in the initial position, and the return piston can move frontward and rearward under a guidance of the outer wall of the guide tube and the inner wall of the outer tube after the energy absorption device is impacted. The damping fluid is filled into the cavity between the rear end of the impacted rod and the front end of the return piston. A size of a radial thickest portion of the damping plug is smaller than a radial size of the damping hole, so that a gap is formed therebetween for the damping fluid to circulate between the front cavity and the rear cavity.

Figure 9:
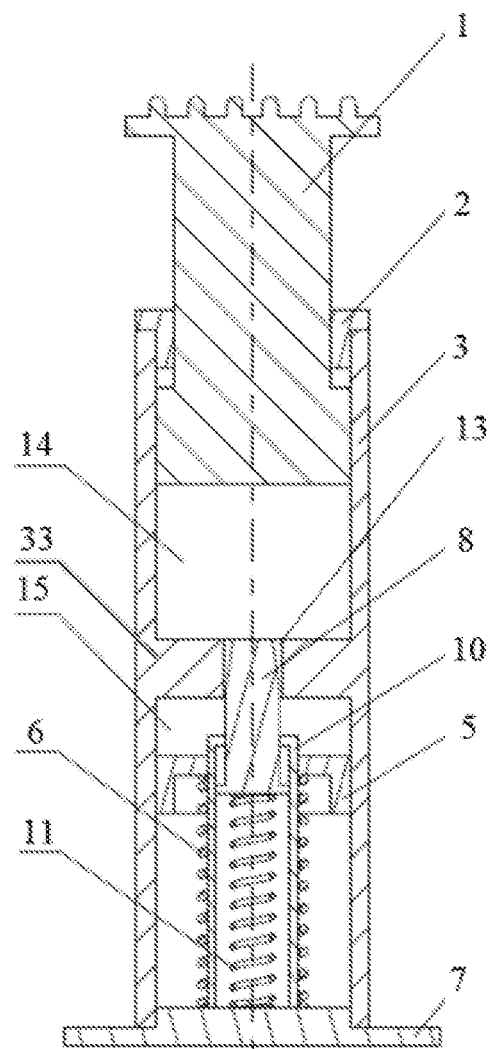
FIG. 9 is a sectional view taken along a line A-A of the structure shown in FIG. 2 in a second embodiment.
Figure 10:
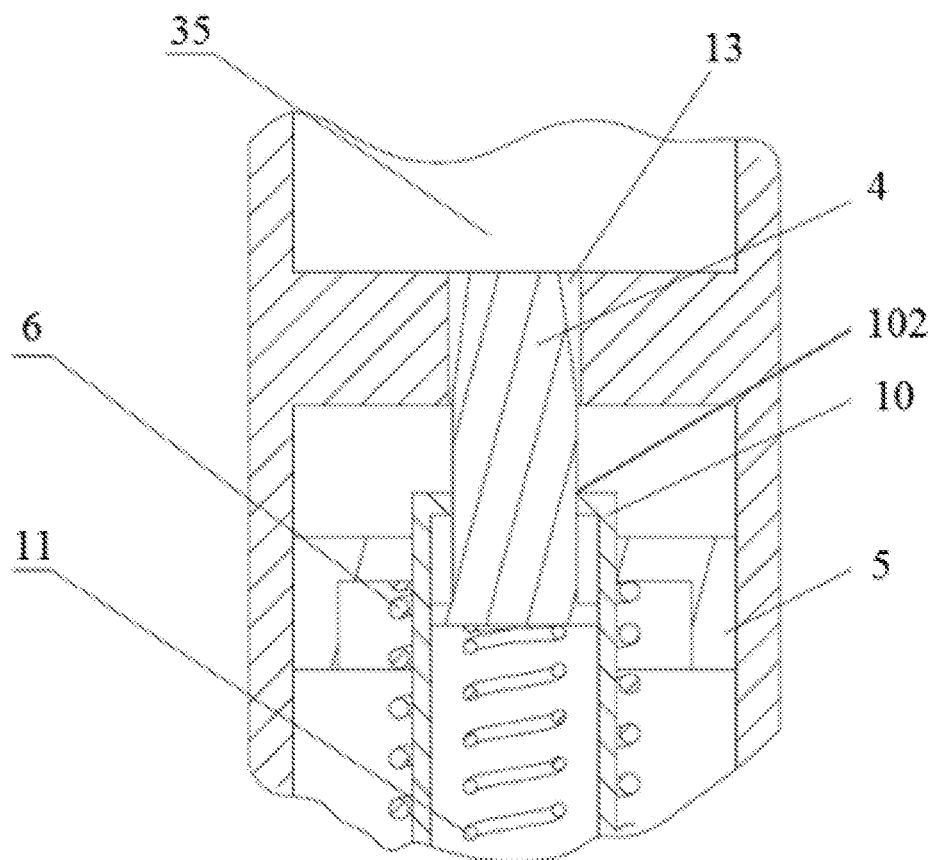
FIG. 10 is an enlarged schematic view of a part of the structure shown in FIG. 9.
Figure 11:
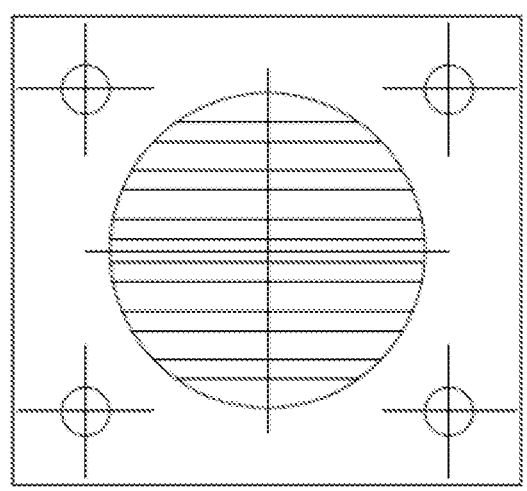
FIG. 11 is a structural schematic view of an end base of a collision energy absorption device according to the disclosure.

In the disclosure, the front end of the guide tube 10 may be set as a closed type with a via hole 102 as shown in FIG. 9 and FIG. 10. The front end of the guide tube may also be set as an open type, and then the damping fluid may be sealed by a closing member connected to the front end of the guide tube to prevent the damping fluid from entering into the damping elastic element. This connection mode is similar to the connection mode between the sealing member 2 and the front end of the outer tube 3 in the disclosure.

Specifically, the damping hole is, for example, a cylindrical through hole with a diameter of 1 to 80 mm. The damping hole in the figure is a cylindrical hole with a diameter of 30 mm. The front end of the corresponding damping plug is a truncated cone with a diameter of 20 mm at the thinnest point and 28 mm at the thickest point that is thicker from front to rear. The height of the truncated cone-shaped front end of the damping plug is consistent with the thickness of the partition plate. A annular gap with a width of 1 mm is formed between the truncated cone-shaped front end of the damping plug and the cylindrical damping hole. The inner diameter of the outer tube is 100 mm. In an initial position, the axial length (length between a rear end surface of the impacted rod and a front end surface of the partition plate) of the front cavity is 80 mm, and the axial length (length between a rear end surface of the partition plate and a front end surface of the return piston) of the rear cavity is 30 mm. In the disclosure, in the initial position, a front end surface of the damping plug is flush with the front end surface of the partition plate. After the collision ends, the front end surface of the damping plug is returned to a position in which the front end surface of the damping plug is flush with the front end surface of the partition plate under the action of the return piston and of the elastic return element.

In a specific implementation manner, the damping elastic element and the elastic return element are both one of a spring and an inert gas. When the damping elastic element and the elastic return element are springs, the rear end of the damping plug is fixedly connected to the front end of the damping elastic element, and the rear end of the damping elastic element is fixedly connected to the end base. The rear end of the return piston is fixedly connected to the front end of the elastic return element, and the rear end of the elastic return element is fixedly connected to the end base. When the damping elastic element and the elastic return element are both inert gases, by filling a certain pressure of inert gas into the corresponding cavity, a relative position between the damping plug and the end base is fixed and a relative position between the return piston and the end base is also fixed, in the initial position. During an impact of the device, the inert gas is compressed and its internal pressure increases. When the impact ends, the external pressure decreases. At this time, the internal pressure of the inert gas is greater than the external pressure, and the inert gas will push the return piston to return to the initial position. In the disclosure, the damping fluid may be hydraulic oil, or may be another fluid having a large viscosity.

In a specific implementation manner, the device further includes a sealing member 2 arranged at the frontmost end of the outer tube and radially outwardly from a middle portion of the impacted rod. Specifically, an axial gap between a front side of a piston end of the impacted rod and the sealing member is set to be a vacuum. In the disclosure, the sealing member 2 mainly performs the following functions. First, the extreme movement position of the impacted rod 1 when it returns frontward under the action of the return piston is blocked. Second, the sealing member 2 is provided separately from the outer tube 3 so that it is most convenient to handle the entire device during assembly and maintenance. For example, there is no need to cut off and then weld the outer tube during assembly. Third, the sealing member 2 can further play a role on the outer tube that the sealing member seals the damping fluid, so as to prevent the damping fluid from leaking outside the device.

In a specific implementation manner, the axial thickness of the partition is d, in which d is 5 to 100 mm, and preferably d is 15 to 45 mm. When the device is in the initial position, the front end surface of the damping plug is flush with the front end surface of the partition plate, or the front end surface of the damping plug is within 0.5 d ahead of the front end surface of the partition plate, or the front end surface of the damping plug is within 0.8 d behind the front end surface of the partition plate. In the disclosure, in the initial position, if the front end surface of the damping plug protrudes too far from the front end surface of the partition plate, the damping plug may be damaged when the device is impacted, and if the front end surface of the damping plug retracts too long from the front end surface of the partition plate, it is difficult to achieve an ideal impact effect. When the front end surface of the damping plug completely exits the damping hole and enters into the rear cavity, the flow of the damping fluid in the gap becomes the flow of the damping fluid in the entire damping hole, so almost no damping effect is achieved at this time.

The working principle of the device in the disclosure is as follows. After an object of a certain mass and speed hits the impacted rod 1, the impacted rod 1 compresses the damping fluid in the front cavity, and the damping fluid generates a damping force through the damping structure. During the impact process, the damping plug moves rearward along the guide tube 10 under the pressure of the damping fluid, and the damping elastic element 11 connected to the damping plug has a reaction force against the damping plug. The two actions will cause the damping plug to move frontward and rearward along the guide tube 10, and the relative position between the damping plug and the damping hole changes during the movement to form a constantly changing damping structure, thereby achieving a better damping effect. During the impact process, as the damping fluid in the rear cavity increases, the return piston 5 moves rearward along the outer wall of the guide tube under the pressure of the damping fluid. After the impact ends, the return piston returns to the initial position along the outer wall of the guide tube under the action of the elastic return element 6. During the return process, the return piston will push the damping fluid and the impacted rod 1 to return to the initial position before the impact occurs.

Figure 6:
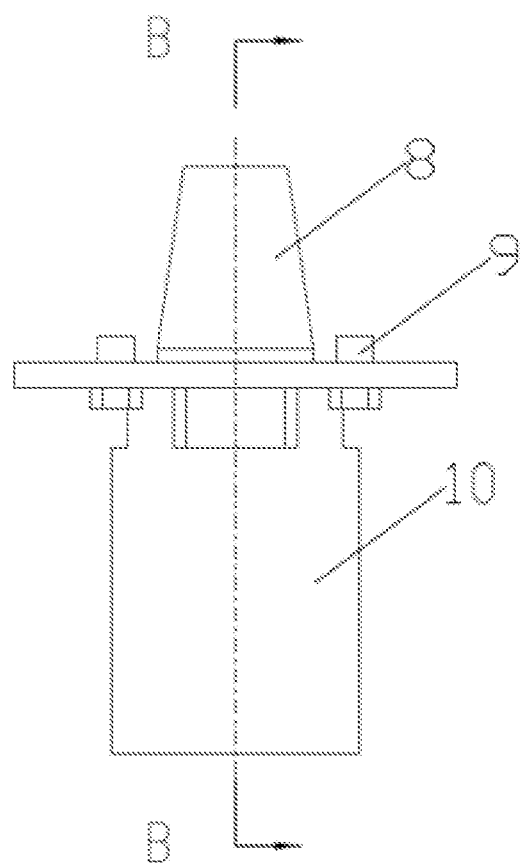
FIG. 6 is a front view of the structure shown in FIG. 5.
Figure 7:
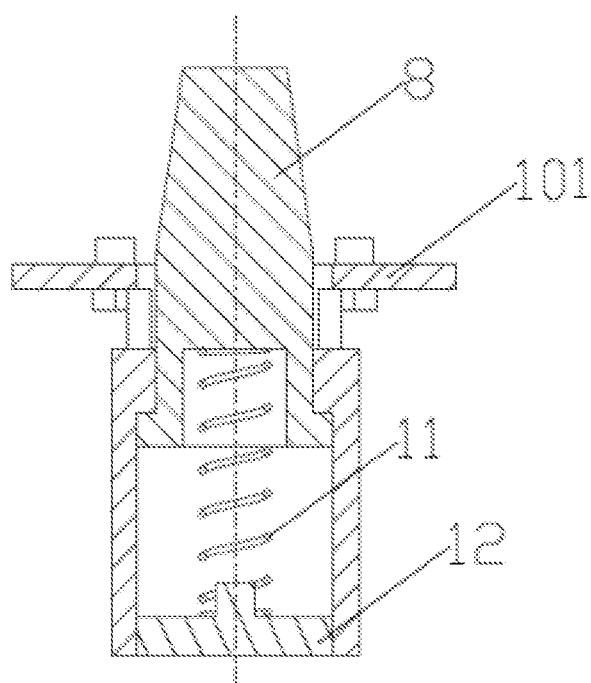
FIG. 7 is a sectional view taken along a line B-B of the structure shown in FIG. 5 and FIG. 6.

FIG. 6 is a simulation result of the collision of the energy absorption device in the first embodiment and the second embodiment at different stiffness of damping springs. The figure shows simulation data obtained by simulating a rigid spring (incompressible), a spring with a stiffness of 1000 N/mm, and a spring with a stiffness of 400 N/mm (which is easier to be compressed than the spring with a stiffness of 1000 N/mm) when the device of the disclosure is impacted by a 1-ton object at a speed of 7 meters per second. It can be seen from the simulation results that when the stiffness of the damping spring is 400 N/mm, the collision energy absorption effect of the device is excellent.

The above description is a further detailed description of the disclosure in combination with specific preferred embodiments. It cannot be considered that the specific embodiments of the disclosure are limited to these descriptions. In addition, it is possible for those of ordinary skill in the technical field to which the disclosure pertains to make several simple deductions and replacements without deviating from the concept of the disclosure. The deductions and replacements should all be regarded as belonging to the protection scope of the disclosure.

The invention claimed is:

1. A reusable collision energy absorption device for a rail vehicle, comprising an impacted rod, an outer tube, a damping structure, a return structure and an end base,
   wherein the damping structure comprises a damping plug, a guide tube and a damping elastic element, and the return structure comprises a return piston and an elastic return element;
   the outer tube is in the form of a tubular structure, and an interior of the outer tube is partitioned into a front cavity and a rear cavity through a partition plate, the partition plate being provided with a damping hole in the form of a through hole, so that a damping fluid is able to circulate between the front cavity and the rear cavity;
   the impacted rod comprises an impacted end at a front end of the impacted rod and a piston end at a rear end of the impacted rod, the piston end of the impacted rod being arranged inside the outer tube, and the impacted end of the impacted rod being arranged outside the outer tube;
   at least a portion of a length of the damping plug is arranged in the damping hole when the damping plug is in an initial position; the damping plug is movable in a front-rear direction of the device when the device is impacted, a rear end of the outer tube being fixedly connected to the end base so that the entire collision energy absorption device is able to be fixedly arranged on the rail vehicle, the rear cavity being provided with the guide tube, the damping elastic element, the return piston and the elastic return element, a front end of the guide tube being provided with a via hole through which a rear end of the damping plug is arranged inside the guide tube; a radial size of the rear end of the damping plug matches with an inner diameter of the guide tube so that the rear end of the damping plug is able to move frontward and rearward along an inner wall of the guide tube after the energy absorption device is impacted; and the return piston is fixedly arranged on the end base through the elastic return element in the initial position; and
   a damping fluid is filled in a cavity between the rear end of the impacted rod and a front end of the return piston, and a size of a radial thickest portion of the damping plug is smaller than a radial size of the damping hole, so that a gap is formed therebetween for the damping fluid to circulate between the front cavity and the rear cavity.

2. The collision energy absorption device according to claim 1, wherein the guide tube is in the form of a tubular structure and have a rear end fixedly arranged on the end base, the rear end of the damping plug is fixedly arranged on the end base through the damping elastic element in the initial position; the return piston is arranged outside an outer wall of the guide tube, and the return piston is able to move frontward and rearward under a guidance of the outer wall of the guide tube and an inner wall of the outer tube, or under the guidance of the outer wall of the guide tube or the inner wall of the outer tube, after the energy absorption device is impacted.

3. The collision energy absorption device according to claim 2, wherein an axial thickness of the partition is d, d is 5 to 100 mm, preferably 15 to 45 mm; and when the device is in the initial position, a front end surface of the damping plug is flush with a front end surface of the partition plate, or the front end surface of the damping plug is within 0.5 d ahead of the front end surface of the partition plate, or the front end surface of the damping plug is within 0.8 d behind the front end surface of the partition plate.

4. The collision energy absorption device according to claim 2, wherein the inner diameter of the guide tube is larger than a radial size of the via hole, and the inner diameter of the guide tube is larger than the radial size of the damping hole.

5. The collision energy absorption device according to claim 1, wherein the damping structure further comprises a small base of end that is also arranged in the rear cavity, the guide tube is in the form of a tubular structure and have a front end fixedly arranged on the partition plate through a connecting plate, the small base of end is fixedly arranged inside the rear end of the guide tube, and the rear end of the damping plug is fixedly arranged on the small base of end through the damping elastic element, in the initial position; the return piston is arranged at the axial rear end of the guide tube, and the return piston is able to move frontward and rearward under a guidance of an inner wall of the outer tube after the energy absorption device is impacted; and the guide tube is also provided with feed through orifices so that the damping fluid is able to flow in the front cavity, the gap, the feed through orifices, and the rear cavity in a region outside the guide tube and the small base of end.

6. The collision energy absorption device according to claim 5, further comprising a blocking member arranged between the small base of end and the return piston for preventing the return piston from excessively returning and colliding with the small base of end, preferably, the blocking member is a blocking ring fixedly arranged on the inner wall of the outer tube, and preferably, the connecting plate at the front end of the guide tube is fixedly arranged on the partition plate by bolts.

7. The collision energy absorption device according to claim 6, wherein an axial thickness of the partition is d, d is 5 to 100 mm, preferably 15 to 45 mm; and when the device is in the initial position, a front end surface of the damping plug is flush with a front end surface of the partition plate, or the front end surface of the damping plug is within 0.5 d ahead of the front end surface of the partition plate, or the front end surface of the damping plug is within 0.8 d behind the front end surface of the partition plate.

8. The collision energy absorption device according to claim 1, wherein the gap is an annular gap with a width of 0.01 to 5 mm, preferably 0.5 to 1.5 mm; preferably, the damping fluid is hydraulic oil; and preferably, the device further comprises a sealing member arranged at the frontmost end of the outer tube and radially outwardly from a middle portion of the impacted rod.

9. The collision energy absorption device according to claim 6, wherein the inner diameter of the guide tube is larger than a radial size of the via hole, and the inner diameter of the guide tube is larger than the radial size of the damping hole.

10. The collision energy absorption device according to claim 5, wherein an axial thickness of the partition is d, d is 5 to 100 mm, preferably 15 to 45 mm; and when the device is in the initial position, a front end surface of the damping plug is flush with a front end surface of the partition plate, or the front end surface of the damping plug is within 0.5 d ahead of the front end surface of the partition plate, or the front end surface of the damping plug is within 0.8 d behind the front end surface of the partition plate.

11. The collision energy absorption device according to claim 5, wherein the inner diameter of the guide tube is larger than a radial size of the via hole, and the inner diameter of the guide tube is larger than the radial size of the damping hole.

12. The collision energy absorption device according to claim 8, wherein an axial thickness of the partition is d, d is 5 to 100 mm, preferably 15 to 45 mm; and when the device is in the initial position, a front end surface of the damping plug is flush with a front end surface of the partition plate, or the front end surface of the damping plug is within 0.5 d ahead of the front end surface of the partition plate, or the front end surface of the damping plug is within 0.8 d behind the front end surface of the partition plate.

13. The collision energy absorption device according to claim 8, wherein the inner diameter of the guide tube is larger than a radial size of the via hole, and the inner diameter of the guide tube is larger than the radial size of the damping hole.

14. The collision energy absorption device according to claim 1, wherein a front end of the damping plug is a structure having a truncated cone shape or a truncated pyramid shape and being thicker from front to rear.

15. The collision energy absorption device according to claim 14, wherein an axial thickness of the partition is d, d is 5 to 100 mm, preferably 15 to 45 mm; and when the device is in the initial position, a front end surface of the damping plug is flush with a front end surface of the partition plate, or the front end surface of the damping plug is within 0.5 d ahead of the front end surface of the partition plate, or the front end surface of the damping plug is within 0.8 d behind the front end surface of the partition plate.

16. The collision energy absorption device according to claim 14, wherein the inner diameter of the guide tube is larger than a radial size of the via hole, and the inner diameter of the guide tube is larger than the radial size of the damping hole.

17. The collision energy absorption device according to claim 1, wherein the damping elastic element and the elastic return element are both one of a spring and an inert gas; and preferably, when the damping elastic element is a spring, the spring stiffness thereof is 50 to 2000 N/mm, preferably 100 to 1000 N/mm.

18. The collision energy absorption device according to claim 1, wherein in an initial state, a volume of a cavity between a rear end surface of the impacted rod and a front end surface of the partition plate is larger than a volume of a cavity between a rear end surface of the partition plate and a front end surface of the return piston.

19. The collision energy absorption device according to claim 1, wherein an axial thickness of the partition is d, d is 5 to 100 mm, preferably 15 to 45 mm; and when the device is in the initial position, a front end surface of the damping plug is flush with a front end surface of the partition plate, or the front end surface of the damping plug is within 0.5 d ahead of the front end surface of the partition plate, or the front end surface of the damping plug is within 0.8 d behind the front end surface of the partition plate.

20. The collision energy absorption device according to claim 1, wherein the inner diameter of the guide tube is larger than a radial size of the via hole, and the inner diameter of the guide tube is larger than the radial size of the damping hole.

* * * * *